Jan. 8, 1952     C. PYLE ET AL     2,581,881
AQUEOUS FORMALDEHYDE DISTILLATION
Filed June 11, 1948
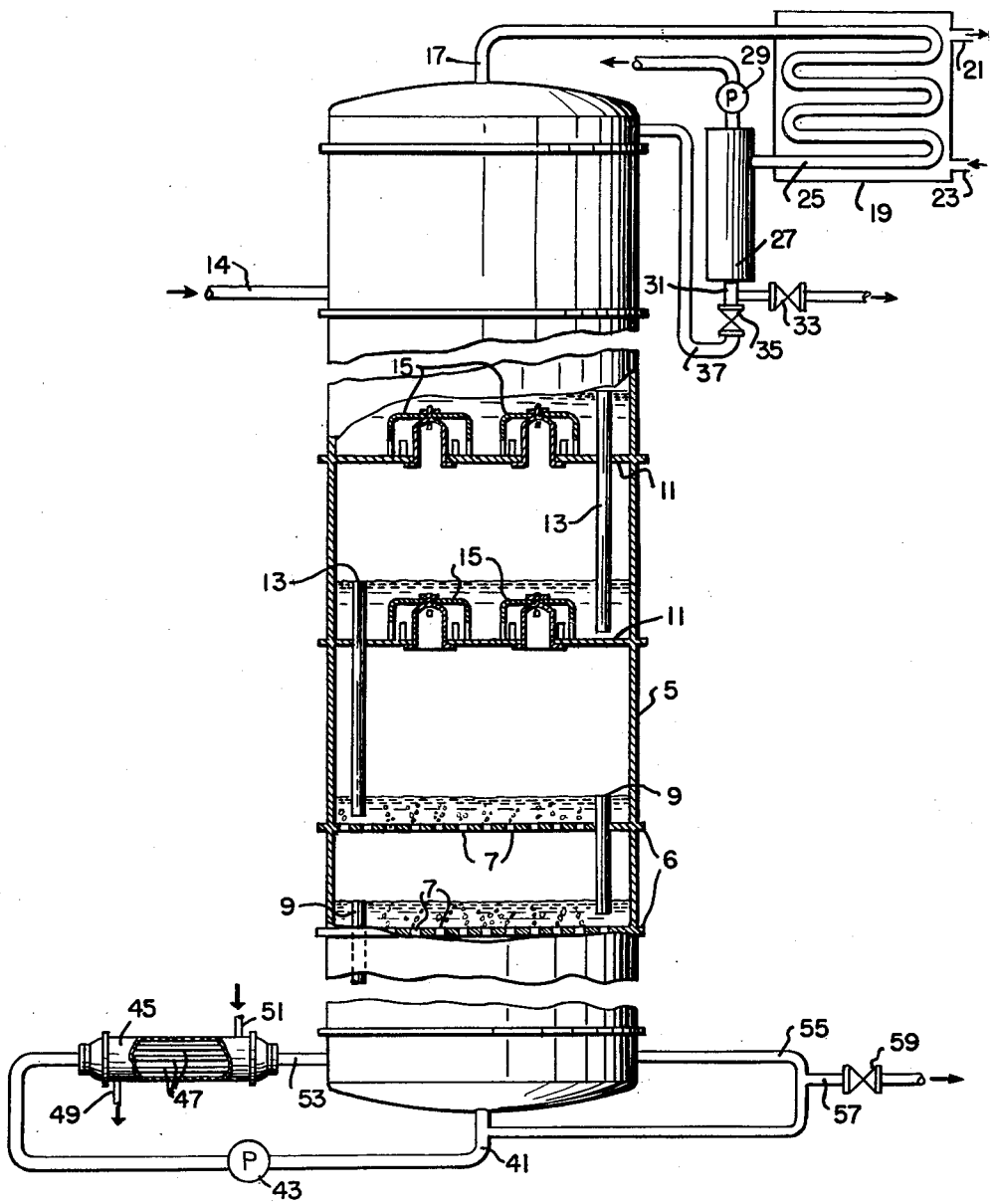
Cyrus Pyle
James A. Lane
INVENTORS
BY
ATTORNEY Patented Jan. 8, 1952

2,581,881

UNITED STATES PATENT OFFICE 2,581,881

AQUEOUS FORMALDEHYDE DISTILLATION

Cyrus Pyle, New Castle, Del., and James A. Lane, Oak Ridge, Tenn., assignors to E. I. du Pont de Nemours & Company, Wilmington, Del., a corporation of Delaware Application June 11, 1948, Serial No. 32,306

2 Claims. (Cl. 202—40)

This invention relates to aqueous formaldehyde distillation, and more particularly it relates to the fractional distillation of aqueous solutions of formaldehyde whereby to concentrate the formaldehyde content thereof to form a concentrated formaldehyde product containing 70% to 97% formaldehyde.

The concentration of aqueous solutions of formaldehyde by fractional distillation to produce a formaldehyde product containing up to 97% formaldehyde is disclosed in our copending patent applications Serial No. 730,634, filed February 24, 1947, now Patent No. 2,527,654, and Serial No. 30,758, filed June 3, 1948, now Patent No. 2,527,655. As pointed out in these patent applications, aqueous solutions of formaldehyde may be concentrated by a fractional distillation system in which the top of the fractional distillation column is operated at a materially lower pressure, 200 mm. Hg, or more, than the bottom thereof. In such distillation, the vaporous phase withdrawn at the top is composed of water vapor and a small amount of formaldehyde vapor, and the liquid phase withdrawn at the bottom may range from a 70% aqueous solution to paraformaldehyde, 93% to 97% formaldehyde.

The apparatus and processes disclosed in the above-said applications have proven to be highly satisfactory, however, some difficulty has been experienced in accumulation of solid paraformaldehyde on the dry surfaces of the chimneys and on the inside of the caps of the bubble caps of the lowermost plates of the fractionating column. The chimneys and caps of the bubble caps positioned on plates carrying solutions of formaldehyde having a formaldehyde content of 65% or more are subject to gradual accumulation of solid paraformaldehyde to the point where the chimneys become plugged and pass very little or no vapors. On the other hand, the use of sieve plates, including screen mesh plates throughout the entire column makes it difficult to obtain the desired plate efficiency or to build up the desired pressure differential through the fractionating column.

It is an object of this invention to provide a suitable fractionation apparatus for the fractionation of aqueous solutions of formaldehyde to produce a formaldehyde product containing between 65% and 97% of formaldehyde without objectionable accumulation of paraformaldehyde on the plates.

It is another object of this invention to provide a process for the continuous concentration of aqueous solutions of formaldehyde to produce a formaldehyde product containing 65% to 97% without interruption as a result of plugging between plates.

Other objects of the invention will appear hereinafter.

The objects of this invention may be accomplished, in general, by fractionating an aqueous solution of formaldehyde in a fractionating column in which the plates carrying aqueous formaldehyde having a formaldehyde concentration exceeding 65% are sieve plates and the remaining plates are bubble-cap plates.

Preferably, all sieve plates below the topmost sieve plate are spaced sufficiently close together that at least some liquid, as a result of the vapors rising therethrough, will splash on the bottom of the next adjacent plate. By the term "sieve plate," it is meant to include screen mesh plates and other plain perforated plates.

It is known that as an aqueous solution of formaldehyde gradually becomes more concentrated in formaldehyde, the formaldehyde polymerizes to form increasing amounts of higher polyoxymethylene glycols, $HO \cdot (CH_2O)_n \cdot H$, the greater the concentration, the greater the numeral $n$. Near the bottom of the column, where the concentration of the formaldehyde in the product is between 80% and 97%, the product is in molten form rather than in aqueous solution. This molten formaldehyde polymer as it boils splashes up from the plates to form a mist of fine particles of formaldehyde polymer which is carried up to the next higher plate. The formaldehyde polymer also volatilizes to form monomeric formaldehyde vapor and very small amounts of water vapor which pass upwardly from plate to plate to gain in water content and lose in formaldehyde content.

At the point where the molten formaldehyde product vaporizes and is carried from one plate to another in the form of a mist, and the vapor and mist pass up through bubble-cap plates, the formaldehyde product, as it contacts the walls of the chimneys in the bubble-caps, has a tendency to solidify and accumulate to plug the bubble-cap chimneys. The accumulation of solid formaldehyde product on the walls of the chimneys or caps may be due to the entrainment of fine particles of molten formaldehyde polymer which upon further loss of water content by contact with the hot chimney and cap walls solidifies and accumulates thereon. It is also possible that the monomeric formaldehyde vapor polymerizes by contact with the hot walls since the vapor is above the dew-point temperature of the vapor but below the temperature at which the partial pressure of the formaldehyde in the vapor is in equilibrium with the decomposition pressure of paraformaldehyde, as described in the copending application of J. F. Walker, Serial No. 33,872, filed June 19, 1948, now Patent Number 2,529,269.

It has been discovered that objectionable accumulation of solid formaldehyde product can be avoided if sieve plates are used in place of bubble-cap plates for those plates in a fractionating column or fractionating column system carrying formaldehyde product containing in excess of 65% formaldehyde, and the plates are spaced sufficiently closely that liquid carried on a plate will be splashed or entrained against the bottom of the next adjacent plate. Apparently, even a small amount of liquid splashed or entrained into contact with the bottom of a sieve plate will be sufficient to wash and redissolve any solidified formaldehyde product which may be formed on the bottom of the plate. The accumulation of solid formaldehyde product in the holes of the sieve plates may also be prevented by the slight intermittent leakage from the openings in the sieve plates.

The remaining plates in the column should be bubble-cap plates to produce the necessary plate efficiency and produce the necessary pressure differential of at least 200 mm. Hg between the top and bottom of the fractionating column.

The present invention will be more clearly apparent by reference to the following detailed description taken in connection with the accompanying illustration of one embodiment of apparatus constructed in accordance with the invention.

Referring to the illustration, reference number 5 designates a fractionating column for the concentration of an aqueous solution of formaldehyde. The column 5 is provided with a plurality of sieve plates 6 having holes 7 and over-flow pipes 9. The sieve plates 6 are provided in sufficient number to carry any formaldehyde product having a concentration of formaldehyde exceeding 65%. The remaining plates in the column 5 are bubble-cap plates 11 provided with conventional bubble-caps 15 and over-flow pipes 13. The bubble-caps are comprised of conventional chimneys and slotted caps as shown. The aqueous formaldehyde solution is passed into the column through a feed line 14 at the point where the concentration of formaldehyde in the feed approximates the concentration of formaldehyde on the plate.

The fractionating column 5 is constructed to provide a considerable pressure differential, at least 200 mm. Hg through the column. As stated in our above-identified copending applications, this may be accomplished by providing a high head of liquid on each bubble-cap plate or by providing chimneys or vapor outlet openings in the plates of restricted number or size so as to build up the required flow resistance.

The vaporous product, composed predominantly of water, is withdrawn at the top of the column 5 through conduit 17. The conduit 17 is constructed in the form of a coil 25 which is surrounded by cooler 19 to form a condenser for the gases. Cold water may be passed through the cooler 19 by means of inlet 23 and outlet 21.

The coil 25 is connected to a vacuum chamber 27. A vacuum pump 29 is connected to the top of chamber 27 and condensed liquid is withdrawn from the bottom of chamber 27 through conduit 31. This liquid is split in two parts, one part being withdrawn through valve 33, and the other part returned through valve 35 and conduit 37 to the column 5, as reflux.

In order to maintain the highly concentrated formaldehyde polymer product at the bottom of column 5 in a molten, flowable condition, it is circulated through steam calandria 45 by means of conduit 41, pump 43, lines 47, and conduit 53. The calandria 45 consists of enclosed lines 47 and steam inlet 51 and steam outlet 49 for passage of steam into contact with the enclosed lines 47.

By the process of this invention, in which the formaldehyde is concentrated first through bubble-cap plates, and then, after reaching a concentration of 65% formaldehyde or greater, through sieve plates, it is possible to concentrate aqueous solutions of formaldehyde to paraformaldehyde (93% to 97% formaldehyde) continuously and trouble-free over long periods of time.

As an example of a suitable fractionating column for the concentration of an aqueous solution of formaldehyde containing between 40% and 50% formaldehyde, the contructional details given below may be followed:

The fractionating column may be generally constructed as shown in the drawing described above. The complete column is provided with a total of 45 plates, of which the bottom 7 are sieve plates and the top 38 are bubble-cap plates. The sieve plates are spaced about seven inches apart and the bubble-cap plates about eighteen inches apart. Approximately 75% of the entire area of the sieve plates are perforated with $\frac{1}{8}$ inch diameter holes on $\frac{1}{16}$ inch centers. The depth of liquid on each sieve plate is two inches and the depth of liquid on each bubble-cap plate is about four inches.

Throughout the specification and claims, any reference to parts, proportions, and percentages refers to parts, proportions, and percentages by weight unless otherwise specified.

Since it is obvious that many changes and modifications can be made in the above-described details without departing from the nature and spirit of the invention, it is to be understood that the invention is not to be limited to said details except as set forth in the appended claims.

What is claimed is:

1. In an apparatus for the concentration of aqueous formaldehyde, a fractionating column having a series of bubble-cap fractionating plates extending from the top of the column downwardly to a point where increased concentration of the formaldehyde will tend to cause accumulation of solid formaldehyde polymer on the dry parts of said bubble-cap plates, the remaining plates of said column consisting of sieve plates, said sieve plates being positioned sufficiently closely to each other that liquid resting thereon will be splashed, by the action of the gas passing therethrough, onto the entire surface of bottoms of the next adjacent plates in such volume as to dissolve the formaldehyde polymer tending to accumulate thereon.

2. The method of concentrating aqueous formaldehyde in a fractionating column which comprises fractionating said aqueous solution of formaldehyde through a sufficient number of fractionating zones that the formaldehyde polymer content of said solution becomes so concentrated as to tend to accumulate in solid form, and passing the concentrated liquid downwardly through a series of vertical zones defined by horizontal perforated plates, passing vapor upwardly through the zones, the zones being of limited vertical extent, such that the upward passage of gas splashes liquid throughout the entire volume of the zone and against the confining bounds thereof.

CYRUS PYLE.
JAMES A. LANE.

REFERENCES CITED

The following references are of record in the file of this patent:

UNITED STATES PATENTS

| Number | Name | Date |
|---|---|---|
| 1,865,172 | Cook | June 28, 1914 |
| 1,741,519 | Huff | Dec. 31, 1929 |
| 1,901,158 | Gray | Mar. 14, 1933 |
| 2,153,526 | Walker | Apr. 4, 1939 |
| 2,217,356 | Becknell | Oct. 8, 1940 |

FOREIGN PATENTS

| Number | Country | Date |
|---|---|---|
| 2,122 | Great Britain | of 1870 |
| 92,083 | France | June 22, 1871 |